United States Patent
Arslan et al.

(10) Patent No.: US 7,702,319 B1
(45) Date of Patent: Apr. 20, 2010

(54) COMMUNICATION APPARATUS INCLUDING A MECHANISM FOR REDUCING LOSS OF TEXT TELEPHONE INFORMATION DURING NORMAL TRAFFIC CHANNEL PREEMPTING

(75) Inventors: Guner Arslan, Austin, TX (US); David O. Anderton, Austin, TX (US)

(73) Assignee: ST-Ericsson SA, Geneva (CH)

( * ) Notice: Subject to any disclaimer, the term of this patent is extended or adjusted under 35 U.S.C. 154(b) by 0 days.

(21) Appl. No.: 11/172,040

(22) Filed: Jun. 30, 2005

(51) Int. Cl.
*H04M 1/76* (2006.01)
*H04M 7/00* (2006.01)

(52) U.S. Cl. .............. 455/414.4; 455/452.1; 379/88.13

(58) Field of Classification Search .............. 455/414.4, 455/412.2, 450, 52, 452.1; 379/52, 93.15, 379/93.26, 88.13, 88.14; 704/270.1, 271
See application file for complete search history.

(56) References Cited

U.S. PATENT DOCUMENTS

| | | | | |
|---|---|---|---|---|
| 5,404,392 | A * | 4/1995 | Miller et al. ................. | 455/466 |
| 6,381,472 | B1 * | 4/2002 | LaMedica et al. ............ | 455/560 |
| 6,606,722 | B1 * | 8/2003 | Haimi-Cohen .............. | 714/746 |
| 6,611,804 | B1 * | 8/2003 | Dorbecker et al. .......... | 704/271 |
| 6,842,503 | B1 * | 1/2005 | Wildfeuer .................... | 379/52 |
| 7,103,349 | B2 * | 9/2006 | Himanen et al. .......... | 455/412.1 |
| 7,162,012 | B2 * | 1/2007 | Freundlich et al. ............ | 379/52 |
| 2002/0057765 | A1 | 5/2002 | Hyziak | |
| 2003/0053603 | A1 | 3/2003 | Vejlgaard | |
| 2003/0119518 | A1 * | 6/2003 | Cleveland et al. ........... | 455/450 |
| 2004/0137944 | A1 * | 7/2004 | Lee et al. ..................... | 455/557 |
| 2004/0196961 | A1 * | 10/2004 | Freundlich et al. ............ | 379/52 |
| 2004/0266410 | A1 * | 12/2004 | Sand et al. ................ | 455/414.4 |
| 2005/0064899 | A1 * | 3/2005 | Angelopoulos et al. .. | 455/556.1 |
| 2005/0094777 | A1 * | 5/2005 | McClelland .................. | 379/52 |
| 2005/0237980 | A1 * | 10/2005 | Melhuish .................... | 370/335 |
| 2005/0268198 | A1 * | 12/2005 | Marke et al. ................ | 714/746 |
| 2006/0023848 | A1 | 2/2006 | Mohler | |
| 2006/0056598 | A1 * | 3/2006 | Brandt et al. .................. | 379/52 |
| 2006/0276218 | A1 * | 12/2006 | Goris et al. .............. | 455/550.1 |

* cited by examiner

*Primary Examiner*—George Eng
*Assistant Examiner*—Brandon J Miller
(74) *Attorney, Agent, or Firm*—William J. Kubida; Scott J. Hawranek; Hogan & Hartson LLP

(57) ABSTRACT

A communication apparatus includes a mechanism for reducing loss of text telephone information during normal traffic channel preempting. The communication apparatus includes a transmitter that may generate a signal including a plurality of text telephone symbols for transmission via a voice channel. The transmitter may receive a notification that indicates information transmitted via the voice channel will be replaced by control information. In response to receiving the notification, the transmitter may further selectively prevent at least a portion of the plurality of text telephone symbols from being provided for transmission.

24 Claims, 5 Drawing Sheets

COMMUNICATION APPARATUS INCLUDING A MECHANISM FOR REDUCING LOSS OF TEXT TELEPHONE INFORMATION DURING NORMAL TRAFFIC CHANNEL PREEMPTING

BACKGROUND OF THE INVENTION

1. Field of the Invention

This invention relates to mobile telephony and, more particularly, to modulation of text telephone data for transmission via a mobile telephone medium.

2. Description of the Related Art

Text Telephone (referred to as TTY in North America) equipment has been used in the fixed telephone network for many years to transmit text and speech through the conventional telephone network. In such systems, a conventional telephone is connected to a terminal and the user enters the characters via a keyboard. Some types of TTY systems the telephone handset may be acoustically coupled to the terminal, while in other types of TTY systems the telephone may be directly connected. The terminal encodes the characters into tones (using a mapping code) which are then transmitted from the terminal through the normal voice path of the conventional telephone. A TTY terminal, in conjunction with a telephone on the receiver side, may decode the tones and display the characters on the terminal display.

In the United States, some cellular telephony systems support TTY services using a Baudot Code to map the characters using two tones: 1400 Hz and 1800 Hz. However, conventional digital cellular systems may not provide satisfactory character error rates for text transmitted in the speech channel using the traditional TTY modulation techniques developed for the fixed network. Thus, a new standard has been created to provide this cellular TTY service. The new standard is commonly referred to as Cellular Text Telephone Modem (CTM).

Situations may arise during a mobile call such as during a cell handover, for example, when the normal traffic channel may be preempted and replaced by the transmission of control information using an associated control channel. One example of a control channel used in Global System for Mobile Communications (GSM) systems is a fast associated control channel (FACCH). In a conventional communication apparatus, the loss of normal speech data during preempting may be inconsequential as speech decoders may inject predetermined voice patterns or white noise into the receive path. However, this same loss of data during a text telephone transmission may result in an unacceptable character error rate at the receiver.

SUMMARY

Various embodiments of a communication apparatus including a mechanism for reducing loss of text telephone information during normal traffic channel preempting are disclosed. In one embodiment, the communication apparatus includes a transmitter configured to generate a signal including a plurality of text telephone symbols for transmission via a voice channel. The transmitter may be configured to receive a notification that indicates information transmitted via the voice channel will be replaced by control information. In response to receiving the notification, the transmitter may be further configured to selectively prevent at least a portion of the plurality of text telephone symbols from being provided for transmission.

In one specific implementation, the transmitter may prevent the at least a portion of plurality of text telephone symbols from being provided for transmission in response to determining that less than a predetermined minimum number of character data bits have been transmitted.

In another specific implementation, the text telephone symbols may be symbols that include a plurality of bits encoded according to a cellular text telephone modem (CTM) protocol.

Figure 1:
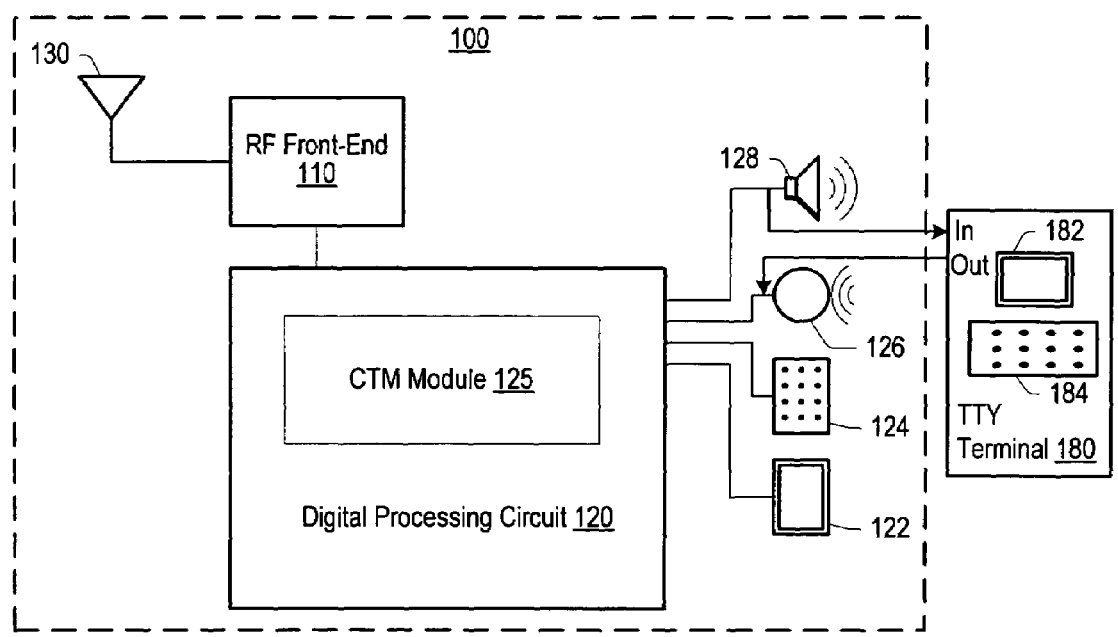
FIG. 1 is a generalized block diagram of one embodiment of a communication apparatus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a generalized block diagram of a communication apparatus 100 is shown. Communication apparatus 100 includes an RF front-end circuit 110 coupled to a digital processing circuit 120. As shown, various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110. It is noted that in various embodiments, communication apparatus 100 may include additional components and/or couplings not shown in FIG. 1 and/or exclude one or more of the illustrated components, depending on the desired functionality. It is further noted that components that include a reference number and letter may be referred to by the reference number alone where appropriate, for simplicity.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, communication apparatus 100 may provide RF reception functionality, RF transmission functionality, or both (i.e., RF transceiver functionality).

Communication apparatus 100 may be configured to implement one or more specific communication protocols or standards, as desired. For example, in various embodiments communication apparatus 100 may employ a time-division multiple access (TDMA) standard or a code division multiple access (CDMA) standard to implement a standard such as the Global System for Mobile Communications (GSM) standard, the Personal Communications Service (PCS) standard, and the Digital Cellular System (DCS) standard. In addition, many data transfer standards that work cooperatively with the GSM technology platform may also be supported. For example, communication apparatus 100 may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), and the high speed circuit switched data (HSCSD) standard, among others. In addition, as mentioned above, communication apparatus 100 may implement the emerging Cellular Text Telephone Modem (CTM) standard.

RF front-end circuit 110 may accordingly include circuitry to provide RF reception capability and/or RF transmission capability. In one embodiment, front-end circuit 110 may down-convert a received RF signal to baseband and/or up-convert a baseband signal for RF transmission. RF front-end circuit 110 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 110 may additionally employ a low noise amplifier (LNA) for amplifying an RF signal received at antenna 130 and/or a power amplifier for amplifying a signal to be transmitted from antenna 130. In alternative embodiments, the power amplifier may be provided external to RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack, control of audio testing, and/or control of user I/O operations and applications. To perform such functionality, digital processing circuit 120 may include various specific circuitry, such as a software programmable MCU and/or DSP (not shown), as well as a variety of specific peripheral circuits such as memory controllers, direct memory access (DMA) controllers, hardware accelerators, voice coder-decoders (CODECs), digital audio interfaces (DAI), UARTs (universal asynchronous receiver transmitters), and user interface circuitry. The choice of digital processing hardware (and firmware/software, if included) depends on the design and performance specifications for a given desired implementation, and may vary from embodiment to embodiment.

In the illustrated embodiment, communication apparatus 100 is coupled to a TTY terminal 180. TTY terminal 180 may include a keyboard 184 and a display 182. As such, TTY terminal 180 may provide a means for entering and displaying text characters for transmission as well as displaying received text characters. For example, a user may connect the input of TTY terminal 180 to the audio output of communication apparatus 100 and the output of TTY terminal 180 to the audio input of communication apparatus 100. In one embodiment, the user may enter text via keyboard 184. The text may appear on display 182. In addition, any text that is received by TTY terminal 180 may appear on display 182. In one embodiment, TTY terminal 180 may convert text characters entered by a user into TTY tones according to a Baudot code or other map and then provide those tones to communication apparatus 100. Similarly, TTY terminal 180 may receive and convert the TTY tones to text characters for display.

As shown, digital processing circuit 120 includes a CTM module 125. CTM module 125 may perform signal-processing tasks associated with CTM modulation and demodulation. For example, CTM module 125 may perform tasks such as CTM tone encoding. CTM module 125 may enable communication apparatus 100 to be used to send and receive text messages from a standard TTY terminal.

As described above, CTM allows reliable transmission of a text telephone conversation alternating with a speech conversation through the existing speech communication paths in cellular mobile phone systems. CTM maps each text character to 8 bits, which may then be encoded with an error-correction code. This process may generate 32 bits per character. After the addition of control bits (e.g., mute, resync, and preamble bits) and interleaving, the bits are grouped into pairs. Each pair is represented by a 40-sample sinusoid at one of the following frequencies: 400, 600, 800, and 1000 Hz. The sampling rate is 8000 Hz, thus providing a bit rate over the channel of 2 bits/5 ms=400 bits/sec. Additional details regarding CTM may be found in the latest revision of the CTM specification 3GPP TS 26.226.

Figure 2:
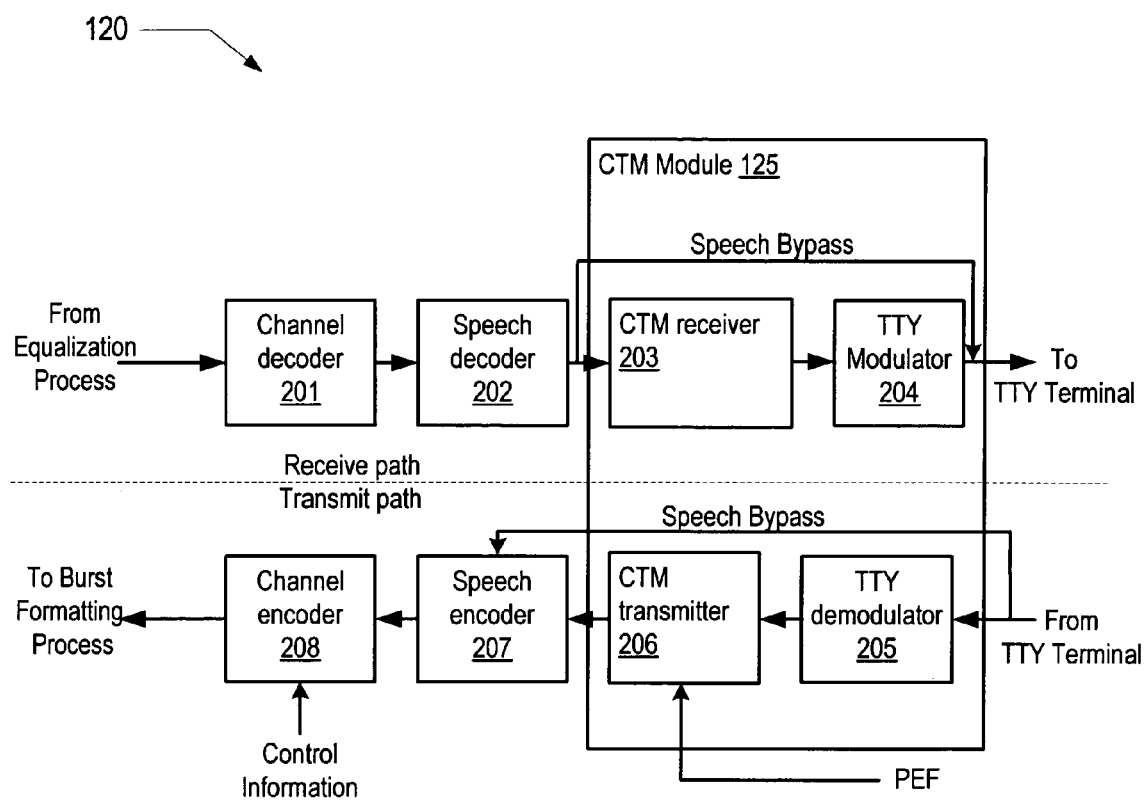
FIG. 2 is a block diagram illustrating specific aspects of one embodiment of the digital processing circuit of FIG. 1.

Referring to FIG. 2, a block diagram illustrating specific aspects of one embodiment of the digital processing circuit of FIG. 1 is shown. Digital processing circuit 120 includes a receive path having a channel decoder 201 coupled to a speech decoder 202. Speech decoder is coupled to CTM module 125, which includes a CTM receiver 203 coupled to a TTY modulator 204. The output of TTY modulator 204 may be provided to a TTY terminal such as TTY terminal 180 of FIG. 1, for example. In addition, CTM module 125 includes transmit path having a TTY demodulator 205 coupled to a CTM transmitter 206. CTM transmitter 206 is coupled to speech encoder 207, which is in turn coupled to channel encoder 208. It is noted that other components within digital processing circuit 120 are not shown for simplicity. In the receive path, in one embodiment, channel decoder 201 may receive channel-equalized soft symbol data from an equalization process. Channel decoder 201 may provide a number of bits to speech decoder 202, which may create speech samples in groups of 160 pulse code modulated (PCM) samples.

Speech decoder 202 may store the PCM samples in a buffer (not shown). The CTM receiver 203 may determine whether the samples are text telephone samples (e.g., CTM symbols) or normal speech samples. If the speech samples contain no text telephone data, the CTM module 125 and its associated CTM processing may be bypassed. However, if CTM receiver 203 determines that the samples are CTM symbols, CTM receiver 203 may demodulate the samples in the buffer into symbols, 40 samples at a time. The symbols may be de-interleaved and decoded into bits which may then be grouped into eight bits and mapped back into characters. The characters may be modulated by TTY modulator 204 into TTY tones according to the Baudot code or other suitable mapping. The TTY modulated signal may be provided to a TTY terminal such as TTY terminal 180 of FIG. 1, for example.

In the transmit path, in one embodiment, a TTY terminal (e.g., TTY terminal 180 of FIG. 1), may provide a TTY modulated signal that includes text characters encoded into tones that are mapped using a Baudot code, for example. The TTY modulated signal may be demodulated into character bits by TTY demodulator 205. CTM transmitter 206 may create symbol bits by generating error correcting code bits such as a forward error correcting code (FEC) bits and control bits, and adding them to each character bit. CTM transmitter 206 may group the symbol bits into bit pairs and depending on the value of each bit pair, generate a 40-sample sinusoid having one of the CTM frequencies described above. If both bit 0 and bit 1 are marked to be muted, a sequence of 40 zero-valued samples may be generated. Table 1 illustrates the bit pair/frequency map used by a CTM modulator. These CTM sinusoid samples may be placed into a PCM buffer in groups of four, encoded by the speech encoder 207 and the channel encoder 208, and provided to a burst formatting process for transmission. Similar to the receive path, the CTM path may be bypassed if the speech data is voice data and has no CTM or text telephone content.

TABLE 1

CTM bit pair/frequency map

|  | bit 1 = 0 | bit 1 = 1 | bit 1 = muted |
| --- | --- | --- | --- |
| bit 0 = 0 | 400 Hz | 600 Hz | 600 Hz |
| bit 0 = 1 | 800 Hz | 1000 Hz | 1000 Hz |
| bit 0 = muted | 800 Hz | 1000 Hz | Zero samples |

In addition, as described above the normal traffic channel may be preempted and replaced by the transmission of control information using an associated control channel. When this occurs, voice data are replaced by the control information. However, as mentioned above, for the normal voice path, the speech decoder 202 may be configured to enhance the received signal to make bad frames or even missing voice data frames less perceptible to the human ear. In contrast to voice data, if the control channel preempting occurs during transmission of CTM text telephone characters, the characters may not be decoded correctly at the receiver, particularly if the control channel preempting occurs during transmission of CTM preamble (e.g., handshaking) information or otherwise early in the character transmission. Accordingly, as described in greater detail below in conjunction with the descriptions of FIG. 3 through FIG. 5, a preemptive frame signal (PEF) may be provided to CTM transmitter 206 by processes operating in the upper layer when control information is to be transmitted. CTM transmitter 206 may be configured to hold off or disable providing CTM information for transmission during transmission of the control information. Furthermore, as described in greater detail below, depending upon the type of receiver that is receiving the CTM signal, one or more specific embodiments of CTM transmitter 206 may be employed.

Figure 3:
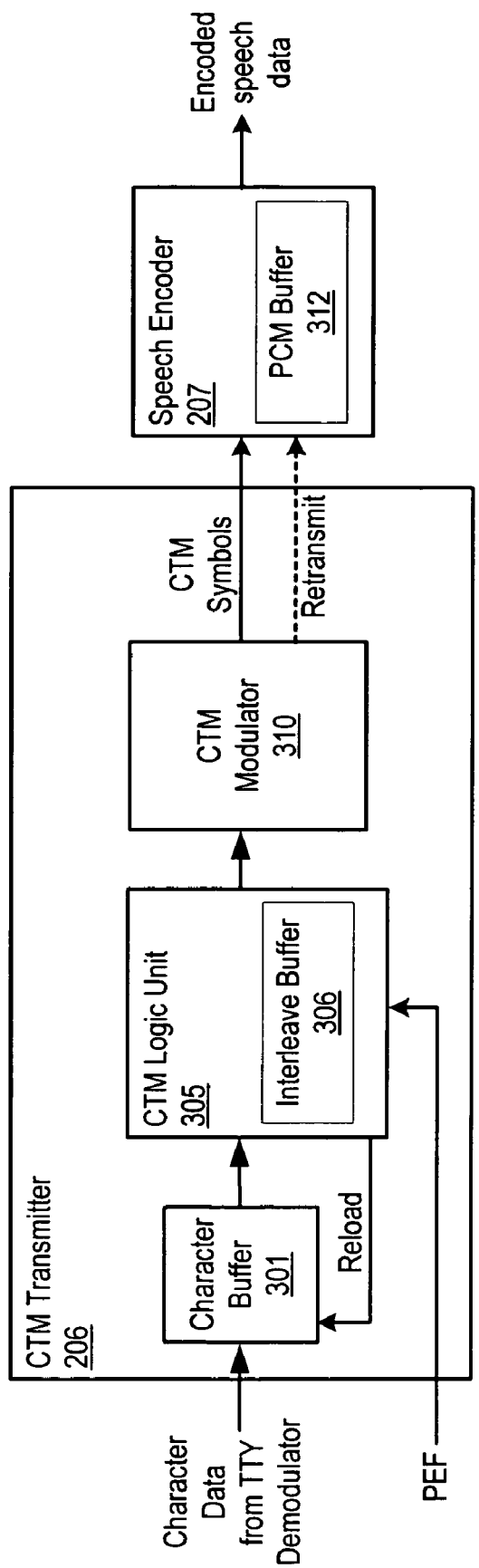
FIG. 3 is a block diagram illustrating one embodiment of the CTM transmitter shown in FIG. 2.

Referring to FIG. 3, a block diagram illustrating one embodiment of CTM transmitter 206 of FIG. 2 is shown. CTM transmitter 206 includes a character buffer 301 coupled to a CTM logic unit 305, which is in turn coupled to a CTM modulator 310.

In various embodiments, character buffer 301 may be, any type of storage that includes a plurality of storage locations used for storing character data. In one particular embodiment, character buffer 301 may be a first-in/first-out (FIFO) buffer. As such character buffer 301 may include a mechanism that allows data that was previously read out of the FIFO to be reloaded back into the head or top of the FIFO. The head or top typically refers to the position or location in the FIFO that will be read next.

In one embodiment, character buffer 301 may receive and store character data from a TTY modulator such as TTY demodulator 205 of FIG. 2, for example. CTM logic unit 305 may receive character data corresponding to one or more characters from character buffer 301. CTM logic unit 305 may be configured to map the TTY demodulated character data to CTM encoded bits. In addition, CTM logic unit 305 may encode the CTM bits with a forward error correcting code (FEC). Further, CTM logic unit 305 may add control bits such as preamble, resynchronization, and/or mute bits, for example. Once the control bits are added, the bits may be interleaved resulting in a multi-bit stream that may be stored within interleave buffer 307. The resulting bit stream may be read out of interleave buffer 307 in bit pairs and provided to CTM modulator 310.

In one embodiment, as described above, CTM modulator 310 may generate a CTM symbol in the form of a 40-sample sinusoid having one of the four CTM frequencies for each bit pair. CTM modulator 310 provides the symbols to speech encoder 207 which forms encoded speech data for transmission in the speech path (e.g., normal traffic channel). However, as mentioned above, processes operating in the upper layer of communication apparatus 100 may preempt the normal traffic channel at any time. As such, any encoded speech data may be overwritten and the corresponding speech information may be replaced by control information.

Accordingly, in one embodiment, a preempting frame signal (PEF) may be received by CTM logic unit 305 from the upper layer processes when the normal traffic channel is going to be preempted by a control channel. In such instances, CTM logic unit 305 may be configured to determine if CTM transmitter 206 is actively transmitting a burst and if so, how many frames of the burst (e.g., speech frames) have been transmitted. For example, it may take 20 speech frames to transmit a typical character. Thus, in one embodiment, if the PEF signal is received after a burst has been started, and less than some number (e.g., less than or equal to four frames) of speech frames have been sent, for example, CTM logic unit 305 may determine that the character(s) may be erroneously decoded at the receiver. In this case, CTM logic unit 305 may regenerate and retransmit the character data that was read from character data that was read from character buffer 301, which effectively terminates the present burst. It is noted that since it may take the receiver several speech frames (e.g., more than the predetermined minimum number) to begin decoding and displaying the text characters, terminating the burst and restarting it may be inconsequential. It is also noted that in other embodiments, CTM logic unit 305 may use a number of speech frames other than four when determining whether the character may be decoded correctly. On the other hand, if greater than the number (e.g., four) of the speech frames have been sent, there may be no way for CTM logic unit 305 to determine whether the character may be properly decoded at the receiver. Accordingly, it may not be necessary to retry that character data and the PEF signal may be ignored.

In an alternative embodiment, CTM transmitter 206 may operate in an expanded mode in which a preempted speech frame may be retransmitted whenever it is preempted regardless of how many frames of the current burst have been transmitted. In such an embodiment, it may be necessary for the receiver unit to be aware of this retransmission scheme. As described in greater detail below in conjunction with the description of FIG. 5, CTM transmitter 206 may initiate a text burst by including a handshake protocol that may indicate the expanded mode to a receiver (if capable) that it may receive retransmitted speech frames that have been preempted.

Figure 4:
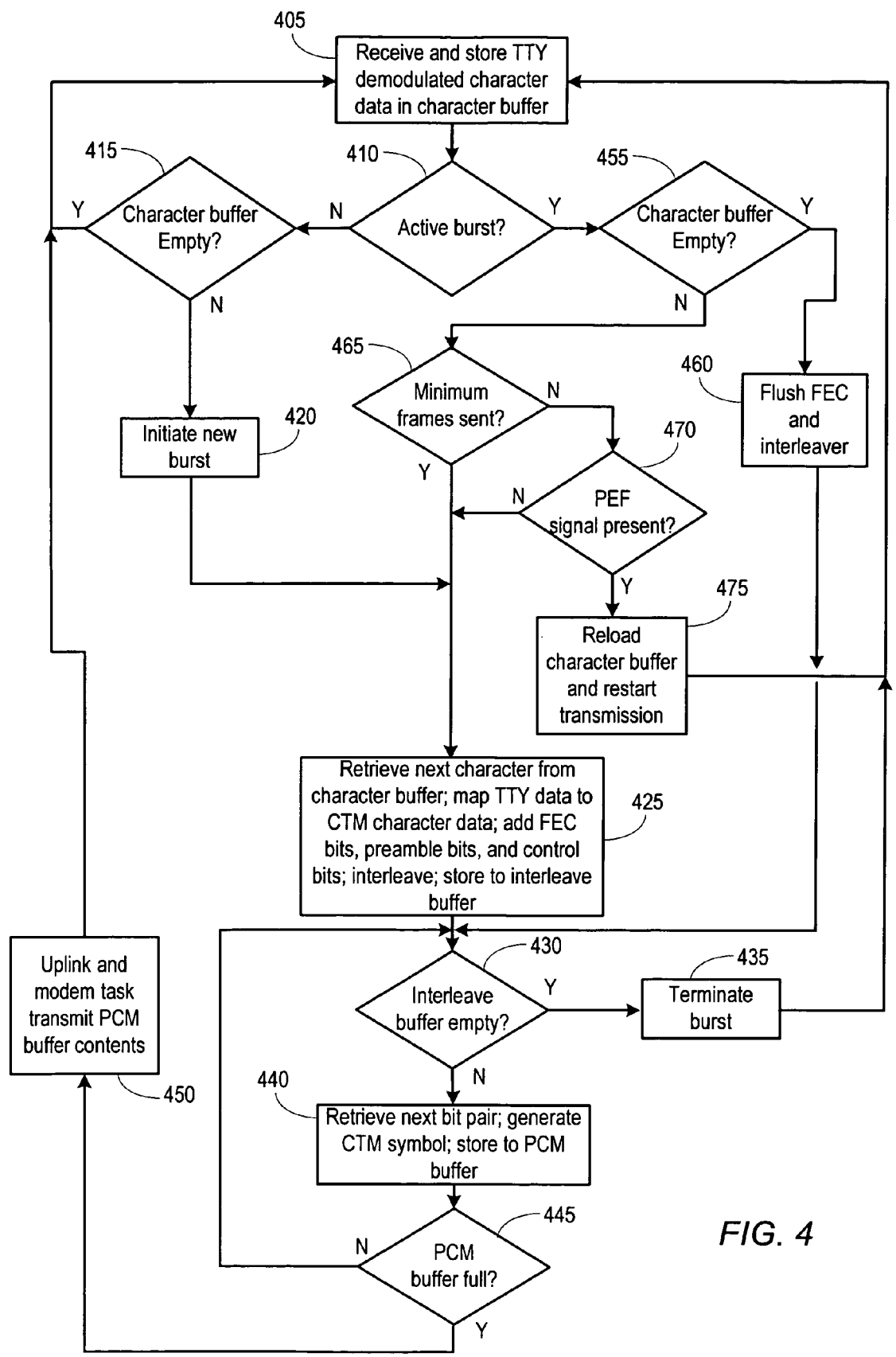
FIG. 4 is a flow diagram describing the operation of one embodiment of the CTM transmitter shown in FIG. 3.

FIG. 4 is a flow diagram describing the operation of one embodiment of CTM transmitter 206 of FIG. 3. Referring collectively to FIG. 2 through FIG. 4, character buffer 301 may receive and store TTY demodulated character data from a TTY modulator 205 (block 405).

During normal operation, CTM logic unit 305 may determine if CTM transmitter is actively transmitting a text burst (block 410). If not, and character buffer 301 is empty, operation proceeds back to block 405. However, if character buffer 301 is not empty (block 415), a new burst may be initiated (block 420).

The TTY demodulated character data may be read from character buffer 301 by CTM logic unit 305. CTM logic unit 305 may map each TTY demodulated character to CTM bits. For example, each received TTY character may be mapped to eight bits. In addition, CTM logic unit 305 may encode each 8-bit character with a forward error correcting code. CTM logic unit 305 may then add control bits such as preamble, resynchronization and or mute bits, for example. Once the control bits are added, the resulting bits may be interleaved to produce a CTM character bit stream which may be stored within interleave buffer 306 (block 425). If interleave buffer 306 is empty (block 430), CTM logic unit 305 may terminate the burst (block 435) and operation may proceed as described above in block 405. However, if interleave buffer 306 is not empty (block 430), CTM logic unit 305 may provide the next two bits to CTM modulator 310 from interleave buffer 306. The bit pair may be modulated as described above, and provided to speech encoder 207 for storage within PCM buffer 312 (block 440).

If PCM buffer 312 is not full (block 445), operation proceeds as described above in block 430 and 440, where bit pairs may be retrieved, modulated and stored within PCM buffer 312. Alternatively if PCM buffer 312 is full (e.g., 160 samples), other operational processes (e.g., uplink and modem tasks) may transmit the PCM buffer content when those processes are ready (block 450).

Referring back to block 410, if CTM transmitter 206 is actively transmitting a burst, but character buffer 301 is empty (block 455), CTM logic 305 may flush the FEC and interleaver (block 460) and once the interleave buffer is empty (block 430) the burst may be terminated (block 435). Operation may proceed as described in block 405, above. However, if CTM transmitter 206 is actively transmitting a burst and character buffer 301 is not empty (block 455), CTM logic unit 305 may determine whether one or more of the first few frames of the burst will be preempted by determining if a minimum number of speech frames have been transmitted (block 465). For example, CTM logic unit 305 may track the number of transmitted speech frames using a counter or other logic. In one embodiment, the minimum number of frames may be five frames.

If the minimum number of frames has not been transmitted (block 465), CTM logic unit 305 may determine whether a PEF signal has been received indicating that one or more frames may be preempted (block 470). If CTM logic unit 305 does not detect an asserted PEF signal, operation proceeds as described above in block 425. However, in response to an asserted PEF signal, CTM logic unit 305 may provide an asserted reload signal to character buffer 301 (block 475). As described above, the reload signal may cause the last character data that was read to be reloaded into the head or top of the character buffer 301. In addition, CTM logic unit 305 may reset state machines and buffer pointers (e.g., interleave buffer 306, etc.) to reinitiate transmission of the burst. Operation proceeds as described above in block 405.

If the minimum number of frames has been transmitted (block 465) the PEF signal may be ignored and operation may proceed as described above in block 425, where the burst continues. As described above, it may take as many as 20 speech frames to complete a burst. During the first four frames of those 20 frames, only a small number of character bits and preamble bits have been sent. Accordingly, it may be presumed that any preempting of speech frames during these first few frames may cause a catastrophic loss of text characters at the receive end, while preempting later frames may not be as costly in terms of character loss at the receive end. It is noted that in other embodiments, the minimum number of speech frames may be different.

Figure 5:
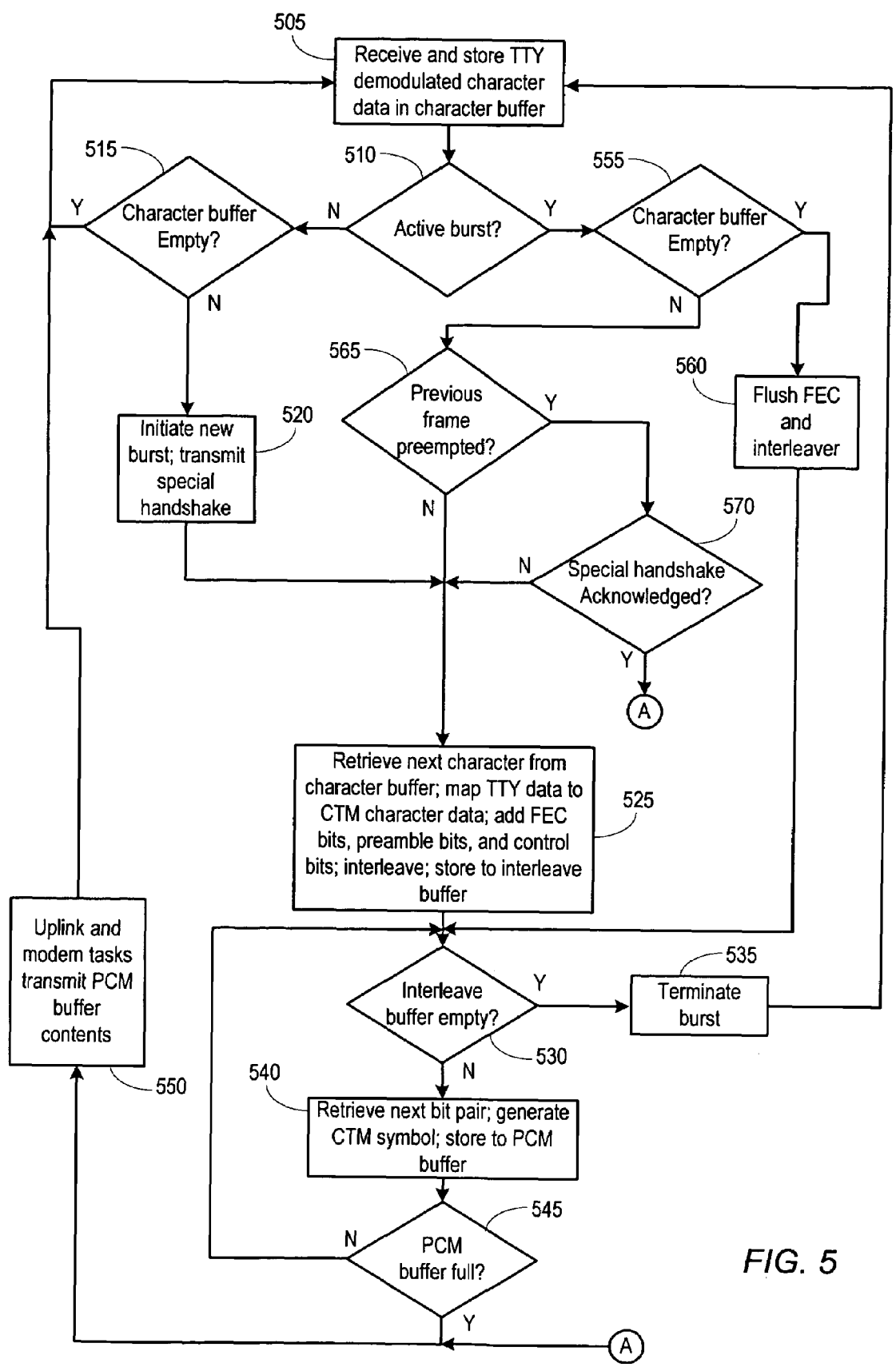
FIG. 5 is a flow diagram describing the operation of another embodiment of the CTM transmitter shown in FIG. 3.

FIG. 5 is a flow diagram describing the operation of another embodiment of CTM transmitter 206 of FIG. 3. Many aspects of the operation of the embodiment of CTM transmitter 206 described in FIG. 5 are similar to the embodiment described in FIG. 4. However, as described further below, the embodiment described in FIG. 5 may additionally initiate a special handshake indicative of an expanded text mode to a receiver unit, and if the receiver unit is compatible, CTM transmitter 206 may be configured to cause one or more preempted speech frames to be retransmitted following the preempted speech frames, without restarting a burst.

Referring collectively to FIG. 2, FIG. 3 and FIG. 5, character buffer 301 may receive and store TTY demodulated character data from a TTY modulator 205 (block 505). During operation, CTM logic unit 305 may determine if CTM transmitter is actively transmitting a text burst (block 510). If not, and character buffer 301 is empty, operation proceeds back to block 505. However, if character buffer 301 is not empty (block 515), a new burst may be initiated (block 520). CTM logic unit 305 may cause a special handshake to be transmitted. For example, in addition to any bits that may normally be sent to a receiver, CTM logic unit 305 may cause one or more additional bits to be transmitted in, for example, the control data. The additional bits may notify a receiver unit that the transmitter may have an expanded CTM mode which may reduce the loss of character data during preempting by an associated control channel. As such, a receiver unit that is compatible with the expanded mode may respond affirmatively to the handshake request, or not as the case may be.

Accordingly, the TTY demodulated character data may be read from character buffer 301 by CTM logic unit 305. CTM logic unit 305 may map each TTY demodulated character to CTM bits. For example, each received TTY character may be mapped to eight bits. In addition, CTM logic unit 305 may encode each 8-bit character with a forward error correcting code. CTM logic unit 305 may then add control bits such as preamble, handshake, resynchronization, and or mute bits, for example. Once the control bits are added, the resulting bits may be interleaved to produce a CTM character bit stream which may be stored within interleave buffer 306 (block 525). If interleave buffer 306 is empty (block 530), CTM logic unit 305 may terminate the burst (block 535) and operation may proceed as described above in block 505. However, if interleave buffer 306 is not empty (block 530), CTM logic unit 305 may provide the next two bits to CTM modulator 310 from interleave buffer 306. The bit pair may be modulated as described above, and provided to speech encoder 207 for storage within PCM buffer 312 (block 540).

If PCM buffer 312 is not full (block 545), operation proceeds as described above in blocks 530 and 540, where bit pairs may be retrieved, modulated and stored within PCM buffer 312. Alternatively if PCM buffer 312 is full (e.g., 160 samples), other operational processes (e.g., uplink and modem tasks) may transmit the PCM buffer content when those processes are ready (block 550).

Referring back to block 510, if CTM transmitter 206 is actively transmitting a burst, but character buffer 301 is empty (block 555), CTM logic 305 may flush the FEC and interleaver (block 560) and once the interleave buffer is empty (block 530) the burst may be terminated (block 535). Operation may proceed as described in block 505, above. However, if CTM transmitter 206 is actively transmitting a burst and character buffer 301 is not empty (block 555), CTM logic unit 305 may determine whether the previous speech frame (e.g., the 160 samples being sent from PCM buffer 312) is being preempted (block 565). For example, in one embodiment, depending on the timing of an asserted PEF signal (i.e., when the asserted PEF signal is received), CTM logic unit 305 may determine that a speech frame is going to be preempted or has been preempted.

If the previous speech frame was/is being preempted (block 565), CTM logic unit 305 may check to see if the receiver unit responded affirmatively or acknowledged the special handshake (block 570). If the receiver acknowledged the special handshake, CTM logic unit 305 may provide an asserted retransmit signal to speech encoder 207. Operation proceeds as described in block 550 where, in response to the retransmit signal, that the PCM buffer content may be transmitted when the other processes are ready to transmit the data. It is noted that in one embodiment, PCM buffer 312 may be configured to hold the current contents until the next sample is ready to be stored. In another embodiment, PCM buffer 312 may be configured to reload the contents that were just read out in response to the retransmit signal. In yet another embodiment, the speech encoder may retransmit the encoded speech data (i.e., the encoded output of speech encoder 207). It is noted that in any of the embodiments, CTM logic unit 305 may delay generating any new symbols until the retransmission of the speech frame(s) is complete.

If the receiver unit did not acknowledge the handshake, operation may proceed as described above in block 525. Referring back to block 565, if an asserted PEF signal was not received or there is otherwise no preempting of a speech frame, operation may proceed as described above in block 525, where the burst continues.

It is noted that the embodiment of FIG. 5 may be combined with the embodiment of FIG. 4, such that if a receiver unit does not acknowledge the special handshake, operation may default to the operation described in the embodiment of FIG. 4. More particularly, if a receiver is not compatible with the expanded mode, CTM logic unit 305 may retransmit an entire burst if preempting occurs within the first few frames (e.g., <=four frames).

It is noted that although the above embodiments have been described in the context of modulating text telephone characters into symbols that correspond to CTM tones, it is contemplated that the apparatus and methods described above may be used to modulate any text telephone characters into symbols that correspond to tones other than CTM tones. More particularly, in other embodiments, a transmitter circuit such as CTM transmitter 206 may be configured to prevent other types of text telephone symbols from being provided to speech encoder 207 in response to an asserted (PEF) signal.

It is also noted that in other embodiments, a communication apparatus such as communication apparatus 100 of FIG. 1 may include functionality associated with TTY terminal functionality. For example, communication apparatus 100 already includes a keypad 124 and display 122. Thus, adding TTY functionality to communication apparatus 100 may include adding circuits that translate text characters entered from the keypad 124 or received from a communication link such as an RS232 or other link, for example, directly to CTM symbols for transmission. Similarly, the additional circuits may translate received CTM symbols directly for display on display 122. It is further noted that CTM transmitter 206 may be used in such an embodiment.

It is further noted that the various components described above may be implemented using hardware circuits, software, or a combination of hardware and software as desired.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A communications apparatus for use in a cellular communications system in which voice channel communications are preempted and replaced with transmission of control information, the communication apparatus comprising:
    a transmitter configured to generate a burst that includes a plurality of text telephone symbols for transmission via a voice channel, the burst including a preamble that indicates the start of the burst, the preamble being followed by the plurality of text telephone symbols;
    wherein the transmitter is configured to receive a notification that indicates the plurality of text telephone symbols for transmission via the voice channel will be replaced by control information and the control information is independent of the text telephone symbols and voice data; and
    wherein in response to receiving the notification and to determining that the burst has been started, the transmitter is further configured to selectively prevent at least a portion of the plurality of text telephone symbols from being provided for transmission.

2. The communication apparatus as recited in claim 1, wherein the transmitter is configured to prevent the at least a portion of plurality of text telephone symbols from being provided for transmission in response to determining that less than a predetermined minimum number of character data bits have been transmitted.

3. The communication apparatus as recited in claim 1, wherein the transmitter is configured to allow the plurality of text telephone symbols to be provided for transmission in response to determining that greater than a predetermined minimum number of character data bits have been transmitted.

4. The communication apparatus as recited in claim 1, wherein the transmitter further includes a character buffer configured to store character data corresponding to text telephone characters.

5. The communication apparatus as recited in claim 4, wherein the transmitter is configured to generate the burst that includes the plurality of text telephone symbols based upon the character data stored within the buffer, and wherein each text telephone symbol corresponds to a portion of a number of bits associated with each character.

6. The communication apparatus as recited in claim 4, wherein the transmitter is further configured to provide a reload signal to the character buffer in response to receiving the notification and in response to determining that less than a predetermined minimum number of character data bits have been transmitted, wherein the reload signal causes data corresponding to one or more last characters transmitted to be reloaded to the character buffer.

7. The communication apparatus as recited in claim 1, wherein the transmitter is further configured to regenerate and retransmit the at least a portion of the plurality of text telephone symbols upon completion of transmission of the control information in response to determining a predetermined number of character bits have not been transmitted.

8. The communication apparatus as recited in claim 7, wherein the transmitter is further configured to generate a handshake for transmission during a burst, wherein the handshake is indicative of the transmitter having a capability of retransmitting one or more speech frames each including a number of character bits that has been replaced by the control information.

9. The communication apparatus as recited in claim 8, wherein the transmitter is further configured to provide a retransmit signal in response to receiving the notification wherein the retransmit signal causes the one or more speech frames to be retransmitted following transmission of the control information.

10. The communication apparatus as recited in claim 1, wherein the transmitter is further configured to generate each symbol of the plurality of text telephone symbols according to a cellular text telephone modem (CTM) protocol, wherein each symbol is a bit pair represented by a 40-sample sinusoid at one of 400 Hz, 600 Hz, 800 Hz, and 1000 Hz.

11. The communication apparatus as recited in claim 1, wherein the control information is transmitted via an associated control channel that uses the same physical channel as the voice channel.

12. The communication apparatus as recited in claim 1, wherein the voice channel is a normal traffic channel for transmitting voice data.

13. A method comprising:
generating a burst that includes a plurality of text telephone symbols for transmission via a voice channel;
receiving a notification that indicates the plurality of text telephone symbols for transmission via the voice channel will be replaced by control information; and
selectively preventing at least a portion of the plurality of text telephone symbols from being provided for transmission in response to receiving the notification and to determining that the burst has been started, wherein the control information is independent of the text telephone symbols and voice data.

14. The method as recited in claim 11, further comprising preventing the plurality of text telephone symbols from being provided for transmission in response to determining that less than a predetermined minimum number of character data bits have been transmitted.

15. The method as recited in claim 11, further comprising allowing the plurality of text telephone symbols to be provided for transmission in response to determining that greater than a predetermined minimum number of character data bits have been transmitted.

16. The method as recited in claim 11, further comprising storing character data corresponding to text telephone characters within a character buffer.

17. The method as recited in claim 16, wherein generating the burst that includes the plurality of text telephone symbols is based upon the character data stored within the buffer, and wherein each text telephone symbol corresponds to a portion of a number of bits associated with each character.

18. The method as recited in claim 16, further comprising causing data corresponding to a last character transmitted to be reloaded to the character buffer by providing a reload signal to the character buffer in response to receiving the notification and in response to determining a predetermined number of character bits have not been transmitted.

19. The method as recited in claim 14, further comprising regenerating and retransmitting the at least a portion of the plurality of text telephone symbols upon completion of transmission of the control information in response to determining a predetermined number of character bits have not been transmitted.

20. The method as recited in claim 13, further comprising generating a handshake for transmission during a burst, wherein the handshake is indicative of the transmitter having a capability of retransmitting one or more speech frames each including a number of character bits that has been preempted by the control information.

21. The method as recited in claim 20, further comprising providing a retransmit signal in response to receiving the notification, wherein the retransmit signal causes the one or more speech frames to be retransmitted following transmission of the control information.

22. The method as recited in claim 13, generating each symbol of the plurality of text telephone symbols according to a cellular text telephone modem (CTM) protocol, wherein each symbol is a bit pair represented by a sinusoid including 40 samples, wherein each symbol is a bit pair represented by a 40-sample sinusoid at one of 400 Hz, 600 Hz, 800 Hz, and 1000 Hz.

23. The method as recited in claim 13, further comprising preempting the voice channel by transmitting the control information via an associated control channel.

24. The method as recited in claim 13, wherein the voice channel is a normal traffic channel for transmitting voice data.

* * * * *